US008727213B2

(12) United States Patent  
Wilen

(10) Patent No.: US 8,727,213 B2
(45) Date of Patent: May 20, 2014

(54) VARNISH PRINTING DOCUMENT SECURING SYSTEM AND METHOD

(71) Applicant: WILopEN Products LC, Deerfield Beach, FL (US)

(72) Inventor: Richard Wilen, Boca Raton, FL (US)

(73) Assignee: WILopEN Products, LC, Deerfield Beach, FL (US)

( * ) Notice: Subject to any disclaimer, the term of this patent is extended or adjusted under 35 U.S.C. 154(b) by 0 days.

(21) Appl. No.: 13/839,884

(22) Filed: Mar. 15, 2013

(65) Prior Publication Data

US 2013/0271546 A1 Oct. 17, 2013

Related U.S. Application Data

(63) Continuation-in-part of application No. 11/351,658, filed on Feb. 10, 2006, and a continuation-in-part of application No. 12/464,740, filed on May 12, 2009, and a continuation-in-part of application No. 12/846,834, filed on Jul. 30, 2010.

(51) Int. Cl.
*G06K 5/00* (2006.01)

(52) U.S. Cl.
USPC .......................... 235/380; 235/375; 235/487

(58) Field of Classification Search
USPC ................................ 235/380, 375, 487, 488
See application file for complete search history.

(56) References Cited

U.S. PATENT DOCUMENTS

| 4,943,093 | A | * | 7/1990 | Melling et al. .................. 283/83 |
| 5,174,608 | A | | 12/1992 | Benardelli |
| 5,447,335 | A | | 9/1995 | Haslop |
| 6,126,013 | A | | 10/2000 | Miller |
| 2004/0247841 | A1 | | 12/2004 | Fischer |
| 2005/0038756 | A1 | * | 2/2005 | Nagel .............................. 705/76 |
| 2006/0017957 | A1 | * | 1/2006 | Degott et al. ................. 358/1.14 |
| 2006/0108412 | A1 | | 5/2006 | Okamoto |
| 2007/0165209 | A1 | * | 7/2007 | Natan et al. ..................... 356/71 |
| 2007/0211238 | A1 | | 9/2007 | Hoffmuller |
| 2007/0246933 | A1 | | 10/2007 | Heim |
| 2008/0145620 | A1 | | 6/2008 | Sahlberg |
| 2010/0027851 | A1 | * | 2/2010 | Walther et al. ................ 382/112 |
| 2011/0087400 | A1 | * | 4/2011 | Lorimier ......................... 701/35 |
| 2013/0269550 | A1 | | 10/2013 | Wilen |

* cited by examiner

*Primary Examiner* — Edwyn Labaze
(74) *Attorney, Agent, or Firm* — Johnson & Martin, P.A.; James David Johnson

(57) ABSTRACT

A paper and document securing system that includes an indicator is used to for validating the paper. The indicator may be printed on a surface of the paper by a printer with clear ink, which may provide a texture. The clear ink may include a substantially clear varnish. Data is includable in the indicator, which may be coded. Validating the paper may include detecting and examining the validity an indicator to accept or reject the paper. The indicator may be partially undetectable without alteration. Graphics are additionally printable on the paper using pigmented ink. The paper may include one or more plies, and the indicator may be printed between plies. Cards may be included on the paper.

19 Claims, 13 Drawing Sheets

VARNISH PRINTING DOCUMENT SECURING SYSTEM AND METHOD

RELATED APPLICATION INFORMATION

This is a continuation-in-part application and claims the benefit of U.S. Nonprovisional patent application Ser. No. 11/351,658 filed Feb. 10, 2006, U.S. Nonprovisional patent application Ser. No. 12/846,834 filed Jul. 30, 2010, and U.S. Nonprovisional patent application Ser. No. 12/464,740 filed May 12, 2009, which is a nonprovisional of U.S. Provisional Patent Application Ser. No. 61/052,377 filed May 12, 2008. The entire contents of the above mentioned patent application documents are hereby incorporated by reference as if fully set forth herein.

FIELD OF THE INVENTION

The invention relates to securing and authenticating papers and documents. More particularly, the invention relates to authenticating cards includable on papers and documents to avert unauthorized reproduction.

BACKGROUND

Papers and documents are often subject to unauthorized and fraudulent reproduction. This fraudulent reproduction is especially unwanted when the paper being reproduced includes a code or indicia that grant its bearer some value, such as a discount or credit with a merchant. The importance of security for papers that deals with money transfers is great.

With photocopiers, scanners, and printers becoming more commonly accessible, there is little to stop a person from reproducing a card or paper with inadequate security measures. Without these protections, both the consumer and the merchants may feel uncomfortable using papers that hold a value. In this instance, comfort is provided by assurance that monies are transferred into proper accounts, accounted for properly and reporting of the funds movement is available as needed.

What is needed is a system to secure papers and documents. Also, a system is needed to produce papers that can be quickly and accurately validated by a consumer, merchant, or other individual. Furthermore, a system is needed that can easily produce a secured paper, which can then be comfortably used in commerce.

SUMMARY

A system is provided for securing paper using an indicator to validate the paper. The indicator may be printed on a surface of the paper by a printer. The indicator may be printed in ink that is at least partially clear. Data may be included by the indicated, which may be used to validate paper.

The terms "print" and "printable" as used herein relate to printing on form or other paper during the manufacturing of the form, or printing on a surface of the form in a first instance by a manufacturer. The terms "imprint" and "imprintable" as used herein refer to printing on one of the forms by a user subsequent to manufacturing. Imprinting can be accomplished manually using a pen, pencil, or other handheld writing instrument, or mechanically using a printer or printing device. For example, the user may imprint customizations onto a blank form in the first instance where the manufacturer has not printed any information on the form during manufacturing, or the user may imprint customizations in a second, third, fourth or other instance onto a form that includes information printed thereon by the manufacturer during manufacturing. By way of further example, a form that includes information printed thereon by the manufacturer during manufacturing is printed in the first instance, customizations subsequently printed onto the form by a first user are imprinted in the second instance, and additional information thereafter printed onto the same form by a second user is imprinted in the third instance.

According to embodiments of the present invention, an varnish printing document securing system is described that may provide security for paper or documents. The system of the present invention may also enable a consumer, merchant, or other individual to quickly and accurately assess the validity of the document. Furthermore, the system of the present invention may easily produce a secured paper, which can then be comfortably used in commerce.

In an embodiment of the present invention, a system for securing paper may include an indicator to validate the paper. The indicator may be printed on a surface of the paper by a printer with at least partially clear ink. The system may also include data to validate the paper. The data may be included in the indicator. Validating the paper may include the steps of a) detecting the indicator that is present on the paper, b) examining the indicator to determine whether the paper is likely to be valid or invalid, c) accepting the paper that is likely to be valid, and d) rejecting the paper that is likely to be invalid. The indicator may add a texture to the surface of the paper on which it is printed. Additionally, the indicator may supplement a graphic printed on the paper by the printer with pigmented ink.

In another aspect, the at least partially clear ink may include an approximately clear varnish.

In another aspect, the printer may be an ink jet printer. The at least partially clear ink may be included in a cartridge to be printed by the ink jet printer.

In another aspect, the indicator may be substantially undetectable without an alteration and detectable with the alteration. The alteration may be applying a pigmented substance to the indicator.

In another aspect, the indicator may include an invalidity notice that is substantially invisible on the paper that is original. The invalidity notice may become substantially visible on an unauthorized reproduction of the paper.

In another aspect, the paper may have a plurality of plies. Each ply may have an interior surface, which may be attached to another ply of the plurality of plies. The indicator may be printed on the interior surface of a ply. The ply with the indicator printed on the interior surface may be attached to additional plies by the interior surfaces of each ply to form the plurality of plies.

In another aspect, wherein the data is coded, validating the paper may additionally include between steps (a) and (c): e) decoding the data coded in the indicator.

In an embodiment of the present invention, a system for securing paper may include an indicator to validate the paper. The indicator may be printed on a surface of the paper by a printer with an at least partially clear ink of an approximately clear varnish. Data may be included in the indicator usable to validate paper. The data may be coded. Validating the paper may include the steps of: a) detecting the indicator that is present on the paper, b) decoding the data coded in the indicator, c) examining the indicator to determine whether the paper is likely to be valid or invalid, d) accepting the paper that is likely to be valid, and e) rejecting the paper that is likely to be invalid. The indicator may add a texture to the surface of the paper on which it is printed.

Additionally, the indicator may be printable on paper that has a plurality of plies. Each ply may have an interior surface to be attached to another ply in the plurality of plies. The indicator may be printed on the interior surface of a ply. The ply with the indicator printed on the interior surface may be attached to additional plies by the interior surfaces of each ply to form the plurality of plies.

In another aspect, the indicator may supplement a graphic printed on the paper by the printer with pigmented ink.

In another aspect, the printer may be an ink jet printer. The at least partially clear ink may be included in a cartridge to be printed by the ink jet printer.

In another aspect, the indicator may be substantially undetectable without an alteration and detectable with the alteration. The alteration may be applying a pigmented substance to the indicator.

In another aspect, the indicator may include an invalidity notice that is substantially invisible on the paper that is original. The invalidity notice may become substantially visible on an unauthorized reproduction of the paper.

In an embodiment of the present invention, a method for securing paper may include: a) coding data to indicate validity of the paper, b) including the data in an indicator, and c) printing an indicator on a surface of the paper with an at least partially clear ink using a printer, the indicator adding a texture to the surface and being examinable to validate the paper. The indicator may supplement a graphic printed on the paper by the printer with pigmented ink.

In another aspect, validating the paper may further include i) detecting the indicator that is present on the paper, ii) decoding that data coded in the indicator, iii) examining the indicator to determine whether the paper is likely to be valid or invalid, iv) accepting the paper that is likely to be valid, and v) rejecting the paper that is likely to be invalid.

In another aspect, the indicator may be substantially undetectable without an alteration and detectable with the alteration. Validating the paper may further include, before step (i), vi) applying a pigmented substance to the indicator.

In another aspect, the at least partially clear ink may include an approximately clear varnish.

In another aspect, the printer may be an ink jet printer. The at least partially clear ink may be included in a cartridge to be printed by the ink jet printer.

In another aspect, the method may include, prior to step (c), d) including an invalidity notice in the indicator that is substantially invisible on the paper that is original and becomes substantially visible on an unauthorized reproduction of the paper.

In another aspect, the paper may have a plurality of plies. Each ply may have an interior surface to be attached to another ply in the plurality of plies. The indicator may be printable on the interior surface of a ply. The ply with the indicator printed on the interior surface may be attached to additional plies by the interior surfaces of each ply to form the plurality of plies.

Unless otherwise defined, all technical terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents and other references mentioned herein are incorporated by reference in their entirety. In the case of conflict, the present specification, including definitions will control.

DETAILED DESCRIPTION

Figure 1:
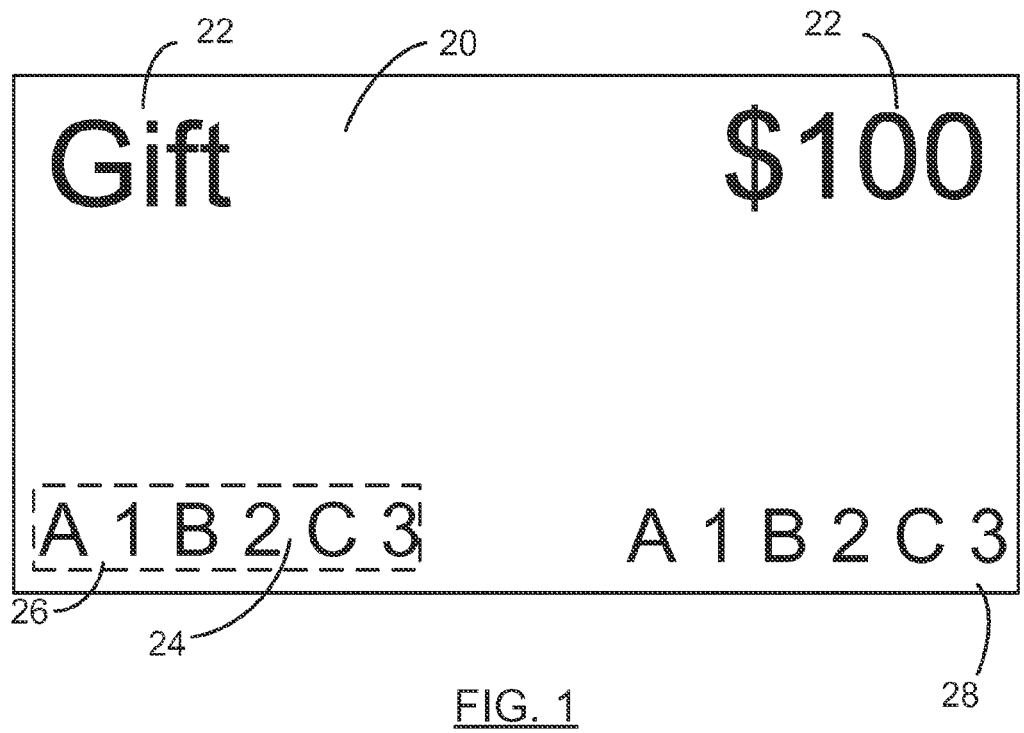
FIG. 1 is a top plan view of a card with security, according to an embodiment of the present invention.

The present invention is best understood by reference to the detailed drawings and description set forth herein. Embodiments of the invention are discussed below with reference to the drawings; however, those skilled in the art will readily appreciate that the detailed description given herein with respect to these figures is for explanatory purposes as the invention extends beyond these limited embodiments. For example, in light of the teachings of the present invention, those skilled in the art will recognize a multiplicity of alternate and suitable approaches, depending upon the needs of the particular application, to implement the functionality of any given detail described herein beyond the particular implementation choices in the following embodiments described and shown. That is, numerous modifications and variations of the invention may exist that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The present invention should not be limited to the particular methodology, compounds, materials, manufacturing techniques, uses, and applications, described herein, as these may vary. The terminology used herein is used for the purpose of describing particular embodiments only, and is not intended to limit the scope of the present invention. As used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" may be a reference to one or more steps or means and may include sub-steps and subservient means.

All conjunctions used herein are to be understood in the most inclusive sense possible. Thus, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise. Structures described herein are to be understood also to refer to functional equivalents of such structures. Language that may be construed to express approximation should be so understood unless the context clearly dictates otherwise.

Unless otherwise defined, all terms (including technical and scientific terms) are to be given their ordinary and customary meaning to a person of ordinary skill in the art, and are not to be limited to a special or customized meaning unless expressly so defined herein.

Terms and phrases used in this application, and variations thereof, especially in the appended claims, unless otherwise expressly stated, should be construed as open ended as opposed to limiting. As examples of the foregoing, the term "including" should be read to mean "including, without limitation," "including but not limited to," or the like; the term "having" should be interpreted as "having at least"; the term "includes" should be interpreted as "includes but is not limited to"; the term "example" is used to provide exemplary instances of the item in discussion, not an exhaustive or limiting list thereof; and use of terms like "preferably," "preferred," "desired," "desirable," or "exemplary" and words of similar meaning should not be understood as implying that certain features are critical, essential, or even important to the structure or function of the invention, but instead as merely intended to highlight alternative or additional features that may or may not be utilized in a particular embodiment of the invention.

Those skilled in the art will also understand that if a specific number of an introduced claim recitation is intended, such an intent will be explicitly recited in the claim, and in the absence of such recitation no such intent is present. For example, as an aid to understanding, the appended claims may contain usage of the introductory phrases "at least one" and "one or more" to introduce claim recitations; however, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C" is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

All numbers expressing dimensions, quantities of ingredients, reaction conditions, and so forth used in the specification are to be understood as being modified in all instances by the term "about" unless expressly stated otherwise. Accordingly, unless indicated to the contrary, the numerical parameters set forth herein are approximations that may vary depending upon the desired properties sought to be obtained.

The present invention will now be described in detail with reference to embodiments thereof as illustrated in the accompanying drawings. In the following description, a system for securing a document will be discussed. Those of skill in the art will appreciate alternative labeling of the system as a security system, authentication system, the invention, or other similar names. Skilled readers should not view the inclusion of any alternative labels as limiting in any way.

In this disclosure, security can be subdivided into several areas that can affect a user's sense of security, and thus comfort. The system of the present invention may include several measures of security included in the system that reflect best practices. These security practices may be used to assist in the authentication of papers or documents, such as printed non-activated direct mail gift cards. Various examples are provided below in the context of gift cards, or more generally, cards. Such examples are provided in the interest of clarity, and should not be read to limit the present invention solely to card-based embodiments.

Referring now to FIG. 1, a card 20 producible by the system will now be discussed. The card 20 may be included on a paper 40, which will be discussed in greater detail below along with FIG. 9. The card 20, along with other cards, may be included on the paper 40, which may be printed by the system using one or more type of ink. The system may print an individual card 20, papers 40, papers that include a number of cards, documents, and/or other printable media.

Paper, as it is used throughout this disclosure, is defined to include a felted sheet of usually vegetable fibers laid down on a fine screen from water suspension. Paper is also defined herein to include a similar sheet of other material, which may include synthetic materials such as plastics. Those of skill in the art will appreciate other sheet or media that may be printed as included in the definition of paper used throughout this disclosure.

One or more graphics 22 may be printed on the card 20. Examples of graphics 22 are illustrated in FIG. 1, which include a label "Gift" in the upper left area of the card 20, a stated value "$100" in the upper right area of the card 20, and a redemption code illustrated at the bottom area of the card 20. In addition to the graphic 22, one or more indicator 24 may be included on the card 20. Examples of indicators 24 may include clear characters 26 printed in a clear ink, represented by the characters being included in the broken line areas of FIG. 1 and other illustrations. Those of skill in the art will appreciate that clear ink, as referenced above, is intended to include ink that is at least partially clear, and should not be limited to absolutely transparent ink. The clear characters may have a texture that is detectable to validate the card on which it is printed.

The card may also include visible characters 28 printed with pigmented ink. The card 20 may include a combination of clear characters 26 and visible characters 28, which may be used to help authenticate the card 20. As illustrated, a set of clear characters 26 may be printed on an area of the card other than an area with visible characters 28. In an alternate embodiment, the characters clear characters 26 and visible characters 28 may be printed on a common area of a card. For example, a clear character 26 may be printed in approximately the same location as a visible character 28, creating the appearance of a raised character. In the example of FIG. 1, the clear characters 26 and visible characters 28 include the same alphanumeric text.

Figure 2:
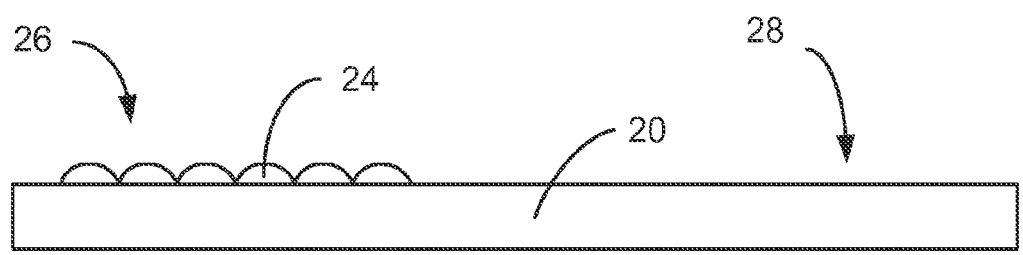
FIG. 2 is a front elevation view of the card of FIG. 1.

The indicators 24 included on the card 20 may be best understood by additionally viewing FIG. 2. The indicators 24 may be formed by being printed with the clear ink. The clear ink may include a varnish, which may form a textured pattern upon drying. The textured pattern may include alphanumeric characters, symbols, dots, shapes, or other textures that could be used to validate the card or paper on which it is printed. Preferably, a varnish included in the clear ink will dry quickly, such that the desired texture of the indicator may be maintained.

The portions of the surface that have been printed with the clear ink may correspond with the indicators 24. Conversely, the portions of the surface that have been printed with visible ink may not include the indicators 24, remaining substantially flat on the surface of the card. The arrangement of printed areas with and without indicators on the card may be used to validate the card, and thus increase the security of the card 20 on which the clear and visible characters 26, 28 are printed.

Figure 3:
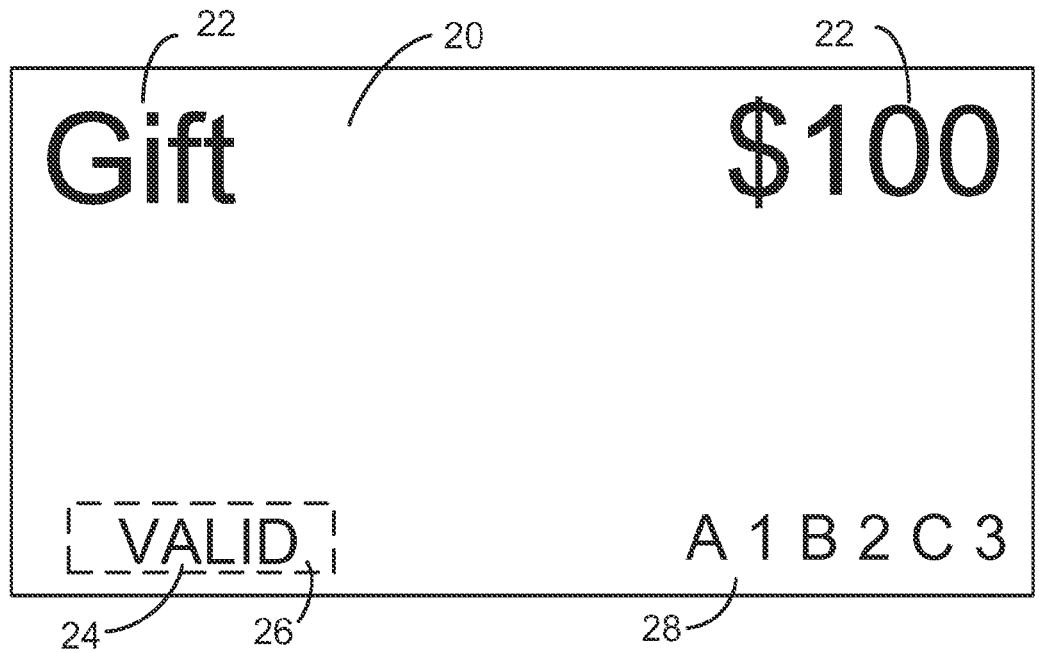
FIGS. 3-6 are top plan views of alternate embodiments of the card of FIG. 1.

Referring now to FIG. 3, an alternate embodiment of the card 20 will now be discussed. In this embodiment, the card may include an indicator 24 with clear characters 26 and a graphic 22 with visible characters 28 that contain differing text or alphanumeric content. The differing text may be predetermined, randomly generated, the product of a calculation or algorithm, or otherwise determined in a way that would be apparent to skilled artisans. The inclusion of printed graphics 22 may be similar the discussion above for FIG. 1.

Figure 4:
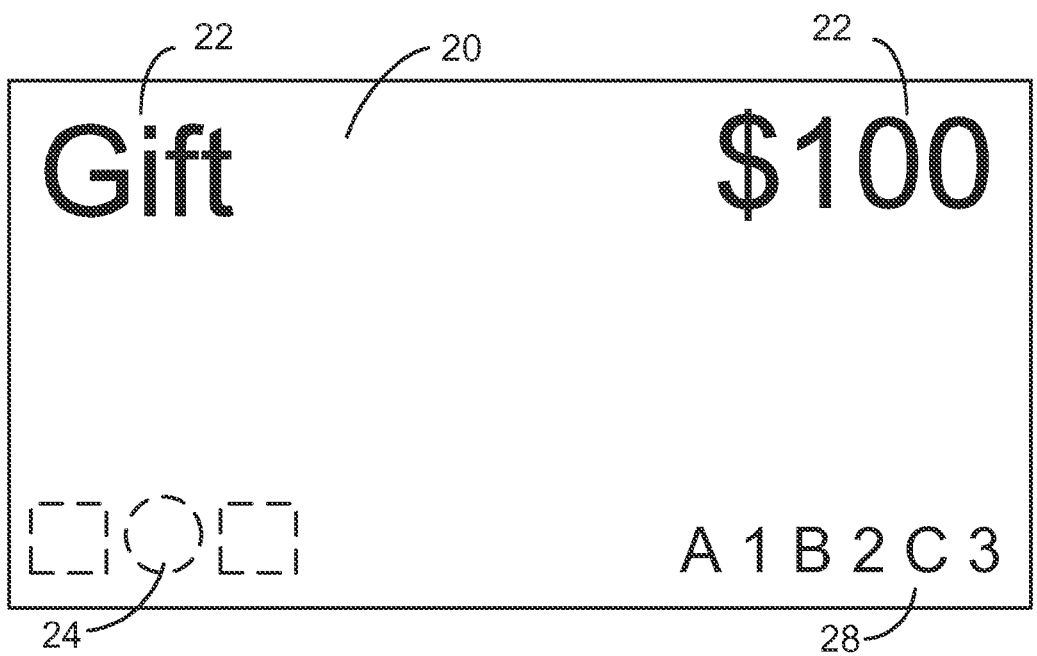

Referring now to FIG. 4, an alternate embodiment of the card 20 will now be discussed. In this embodiment, the card may include an indicator 24 with shapes, such as raised dots or marks, that differ from the non-imprinted visible characters 28. The imprinted shapes may correspond with the non-imprinted visible characters 28. More specifically, the imprinted shapes may be predetermined, randomly generated, the product of a calculation or algorithm, or otherwise determined in a way that would be apparent to skilled artisans. The inclusion of printed graphics 22 may be similar the discussion above for FIG. 1.

Figure 5:
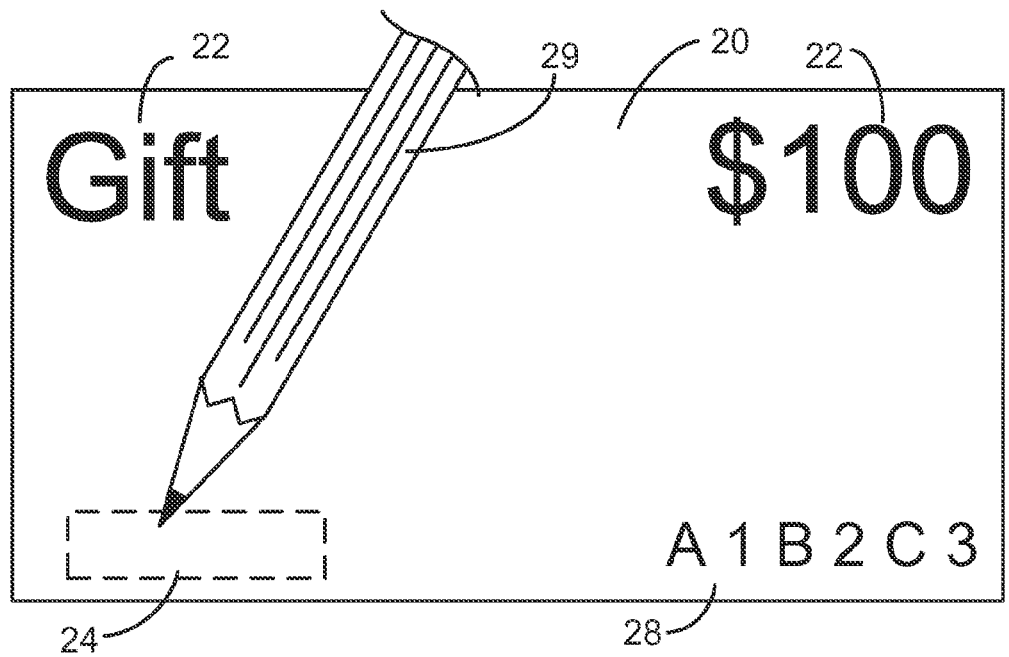
Figure 6:
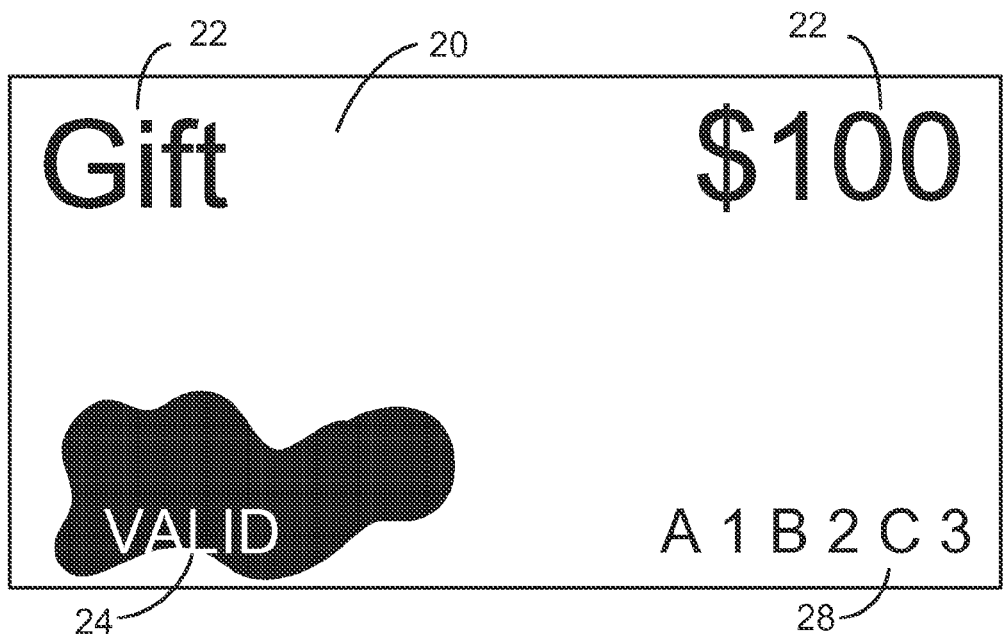

Referring now to FIGS. 5-6, an additional embodiment of the card 20 will now be discussed. In this embodiment, an indicator 24 may be included that is at least partially hidden. More specifically, the system may print an indicator 24 on the card 20 with a slight texture such that is difficult to detect upon inspection with the naked eye.

However, a pigmented substance may be applied to the indicator 24 to alter its appearance. For example, a pencil 29 may be rubbed over the area of the card 20 with the indicator 24, as illustrated in FIG. 5. As graphite from the pencil contacts the textured indicator 24 on the card, however slight, the graphite may cause the indicator 24 to appear darkened compared to the other areas of the card 20, or contrasting a darkend area, as illustrated in FIG. 6. Skilled artisans will appreciate additional pigmented structures that may be used to darken an at least partially hidden impression 24. The inclusion of printed graphics 22 and visible characters 28 may be similar the discussion above for FIG. 1.

Figure 7:
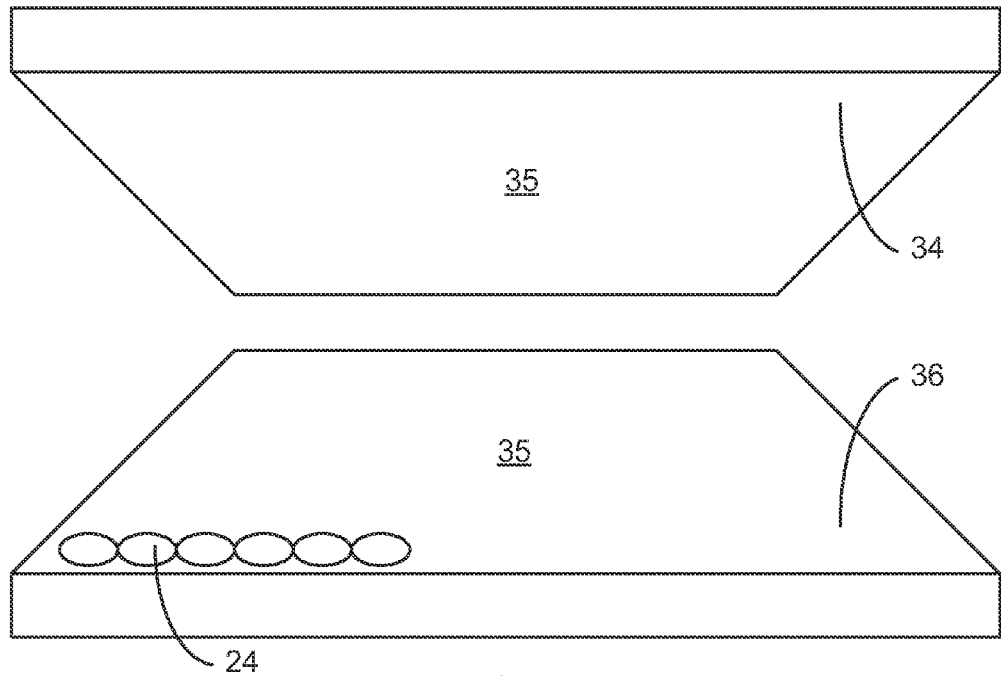
FIG. 7 is a perspective view of an alternate embodiment of the card of FIG. 1 including a plurality of plies.
Figure 8:
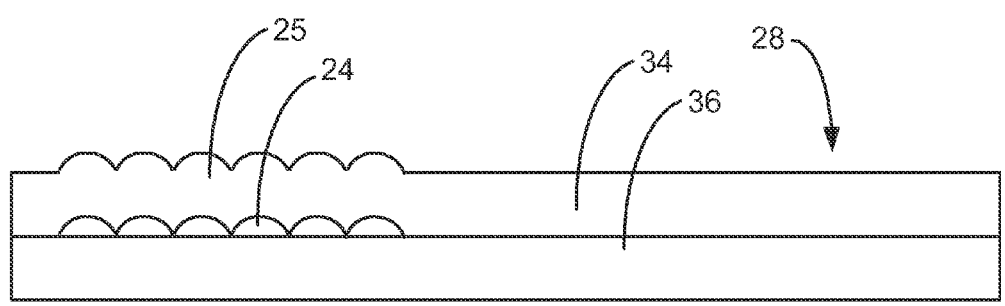
FIG. 8 is a front elevation view of the card of FIG. 7 with the plurality of plies being combined.

Referring now to FIGS. 7-8, an alternate embodiment of the card will now be discussed. In this embodiment, the card may include a plurality of plies attached together. A card with a plurality of plies may be desirable, as it may provide increased rigidity over a card of a single ply. The plies may include an exterior surface facing outward and being visible after the plurality of plies are combined to make the card. The plies may also have an interior surface 35, which may be connected to an interior surface 35 of another ply. Not all plies must have an exterior surface. Plies that are included between other plies may have two interior surfaces 35, on each side, and no exterior surfaces. For example, a middle ply of a card with three plies may have two interior surfaces 35, and no exterior surface.

In the following example, the card may include a two plies 34, 36, without limitation. Indicators 24 may be printed on the interior surface 35 of a ply. The interior surface 35 of the ply 36 with the printed indicators 24 may then be combined with the interior surface 35 of a ply 34 without an indicator 24. Alternatively, indicators 24 may be printed on the interior and exterior surfaces of one or more plies, which may be combined to create the card. As the plies 34, 36 are combined together, the texture of the indicator 24 printed on a first ply 36 may affect the shape or texture of the of the adjacently located ply 34, as perhaps best illustrated by the area 25 in FIG. 8. In this embodiment, the indicator may remain hidden from a user of the card, while be detectable by a merchant or inspector of the card. For example, the texture of the indicators may be detectable through touch or other tactile contact, or through alteration with a pigmented substance, without having any reflective appearance visible to the naked eye. The inclusion of printed graphics 22 and visible characters 28 may be similar the discussion above for FIG. 1.

For the various embodiments of the present invention, the card 20 may indicate patterns of an indicator 24 that should be expected by a user, such as a consumer and/or merchant. For example, the card 20 may include a message stating, "A textured pattern is printed in the bottom left section of the card if valid." The instructions may be included in the graphic 22 printed to the card 20. Additionally, the location of the indicator 24 may be varied between multiple papers 40 and/or cards 20. A message may be included on the card 20 to indicate the expected location of the indicator 24. Alternatively, users may be trained to anticipate locations for the graphic 22 and/or indicator 24, which may be used to validate the card 20.

Figure 9:
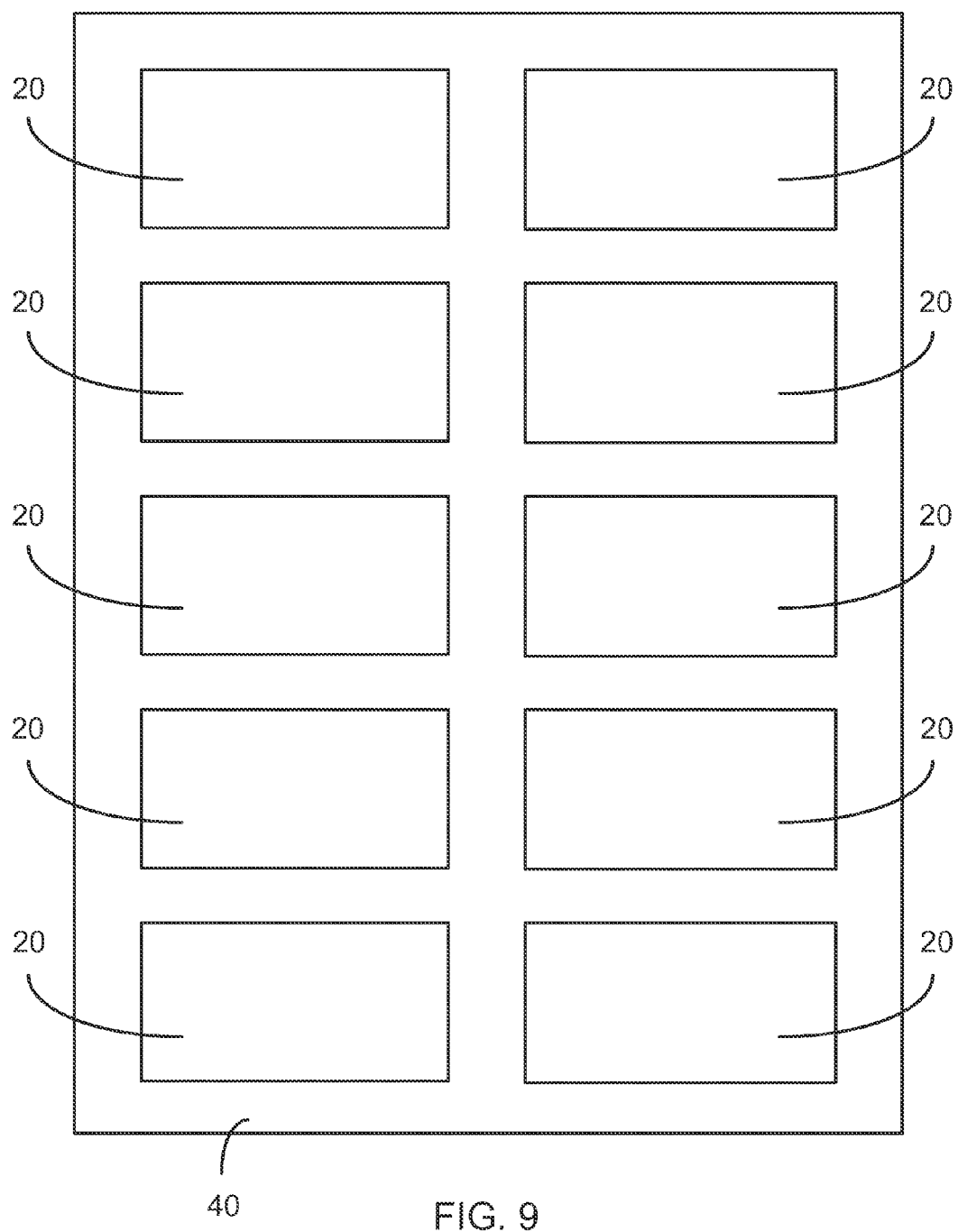
FIG. 9 is a top plan view of a paper with a plurality of cards, according to an embodiment of the present invention.

Referring now to FIG. 9, the paper 40 will be described in greater detail. As shown, the paper 40 may include a plurality of cards 20. The cards 20 may be configured in a rectangular array on the paper 40, or some other array that would be apparent to a skilled artisan. The cards 20 may be detachable from the paper 40 by using a cutting, perforating, or other separating technique. Alternatively, the graphics 22 and indicators 24 may be included on the paper 40 without the intent of partitioning the paper 40 into smaller pieces, such as cards 20. By including multiple cards 20 on sheet of paper 40, the cards 20 may be printed with increased speed and efficiency. However, skilled artisans will appreciate that cards 20 may be printed with graphics 22 and/or indicators 24 without being initially included on paper 40.

Figure 10:
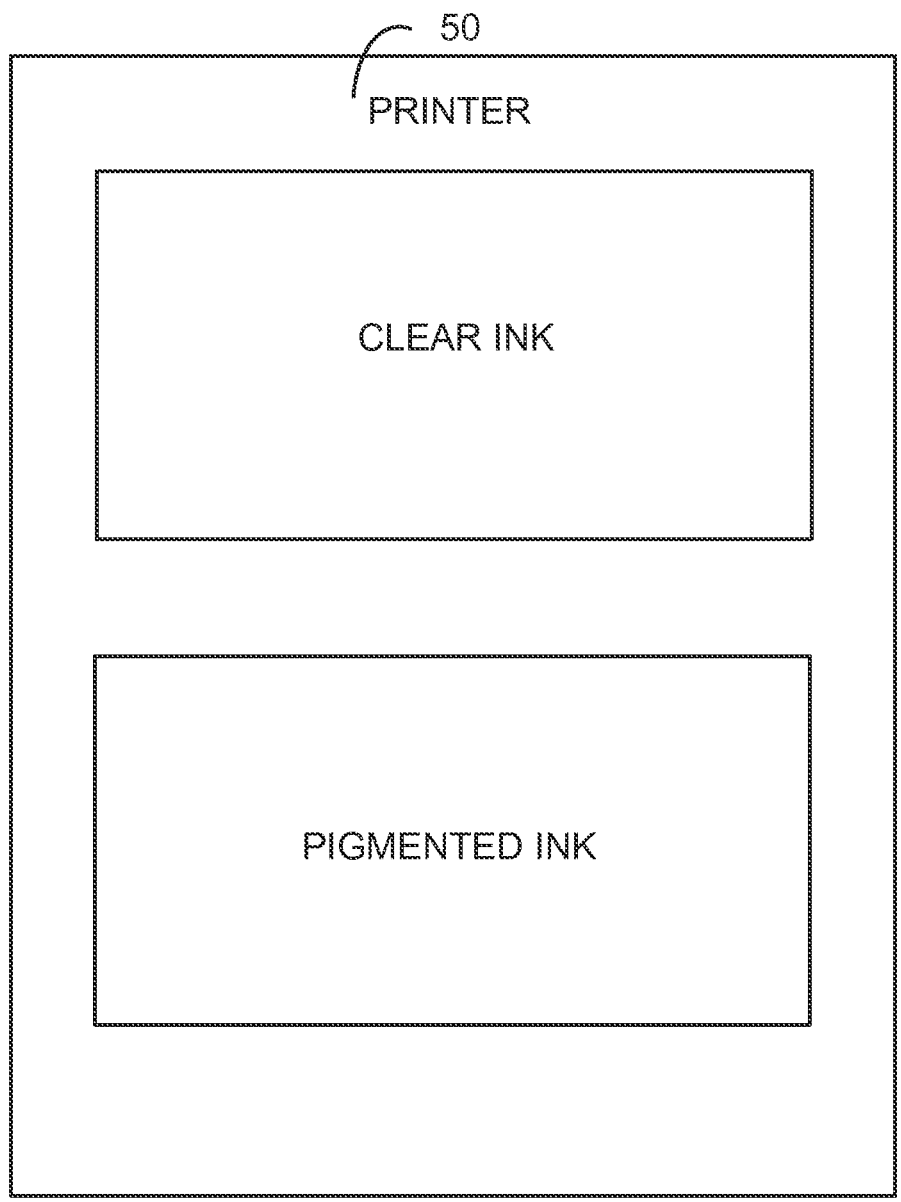
FIG. 10 is a block diagram of a printer, according to an embodiment of the present invention.

Referring now to FIG. 10, along with the above examples of FIGS. 1-9, a printer 50 will now be discussed. It will be understood by skilled artisans that any printing device may be used with the present invention. Discussion of a printer 50 is used throughout this disclosure to clearly illustrate an embodiment of the present invention, and is not intended to limit the printing device to being solely a printer 50. The printer 50 can be any printing device capable of receiving and feeding the sheets of forms or other papers therethrough. For example, the printer can be a home or office printer, such as, for example, a personal printer or desktop printer, or a larger stand-alone multifunction printer such as the types commonly found in offices. The printer can also be an inkjet printer, a laser printer, a wide format plotter, a copy machine, a litho printer, or any other suitable type of printer. The printer can be a standard printing press, a digital printing device or a variable printing device. The printer may be of a type capable of printing on only a single side of a sheet or on both sides of a sheet of the form or other paper.

The printer 50 may produce the cards 20 and/or paper 40 by printing an graphic 22 and an indicator 24. Additional operations may be performed by the printer 50, or a device attachable to the printer, such as separating cards 20 from the paper 40, cutting, laminating, or otherwise treating the cards 20. Skilled artisans will appreciate that such discussion to apply to other embodiments that may print directly to a card 20 or other media, without limitation.

The printer 50 may print visible characters 28 with pigmented ink and clear characters 26 with clear ink. In the interest of clarity, the printer 50 will be discussed as printing to paper 40. The printer 50 and its components may include mechanical and/or electronic devices. In embodiments including electronic devices, the printer 50, or a part of the printer, may include a processor and memory. Instructions may be received by the processor from the memory to control at least part of the printer 50. Instructions may be received by the processor and/or memory by other operatively connected or interfacing devices.

In an embodiment including mechanical devices, the printer 50 may include, for example, one or more printing plate, ribbon, ink source, and/or other printing components. The mechanical parts may be applied to the paper 40 through mechanical action, which would be understood by a skilled artisan. The printer 50 may include a combination of mechanical and electrical parts.

At its most basic operation, the printer 50 may print graphics 22 with text, symbols, or other objects to paper 40 using the visible ink. The printer 50 may also print indicators 24 with text, symbols, or other objects to the paper 40 using the clear ink. The printer 50 may be an ink jet printer, which will be understood by skilled artisans. Alternatively, the printer 50 may print using various printing technologies, such as toner-based laser, additional ink jet technologies, solid ink thermal transfer, dye-sublimation, thermal or ultraviolet inkless, typing, daisy wheel, dot-matrix, line, plotting, or other printing techniques.

The printer 50 may be connected to a computerized device with a processor and memory. The printer 50 may receive instructions from the computerized device, which may define the graphic 22 and/or indicator 24 to be printed, the place at which the graphic 22 and/or indicator 24 should be printed, and other information relating to the printing of the graphic 22 and/or indicator 24. The printer 50 may be configured to print a plurality of graphics 22 and indicators 24 on the paper 40.

The clear ink may be used to print an indicator 24 on the paper 40. As discussed above, the clear ink may include a varnish, which may result in printing an indicator 24 with at least some texture. The printer 50 may be programmed with a pattern to print the indicator 24 on the paper 40 with the clear ink. The printer may variably position a printing head to allow an indicator 24 to be made at a desired place on the paper 40. In an embodiment, the printer 50 may include a plurality of printing heads to print numerous graphics and/or indicators 24 to the paper 40 discretely or simultaneously.

The printer 50 may be configured to print the graphic 22 with the visible ink and the indicator 24 with the clear ink in separate stages. The printer 50 may include one or more printing heads, which may be used to print with the pigmented and/or clear inks For example, the printer 50 may include a printing head for each type of ink to be printed, such as a black pigmented ink, optional color pigmented inks, and the clear ink. In another example, the printer 50 may include a single printing head, which may swap out ink types includable in a cartridge. Alternatively, the printer 50 may be configured to print the graphic 22 and the indicator 24 substantially simultaneously.

Figure 11:
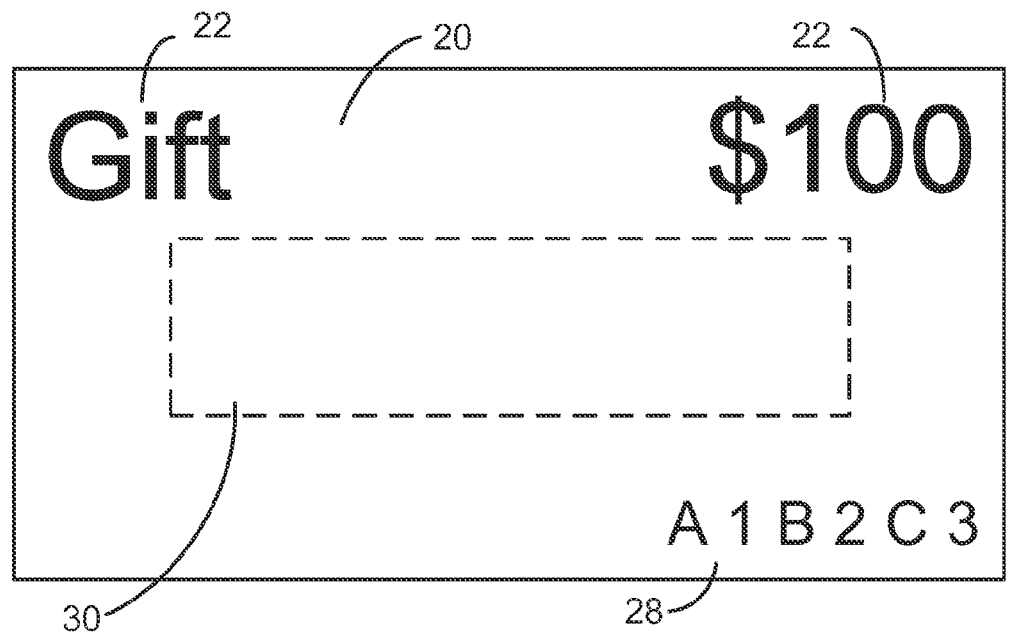
FIGS. 11-12 are top plan views of an alternate embodiment of the card of FIG. 1.
Figure 12:
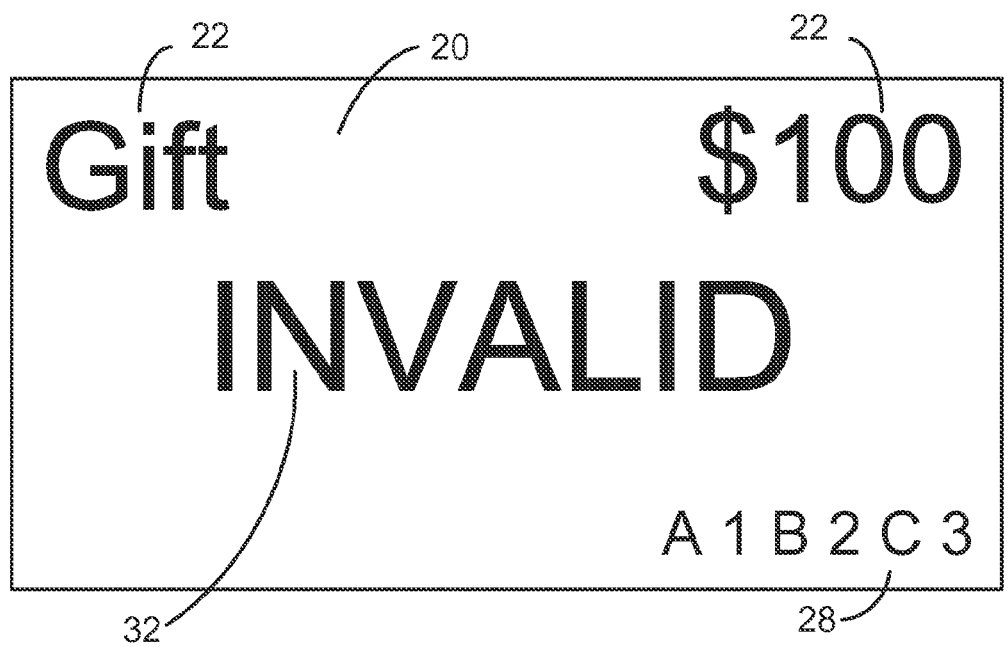

Referring now to FIGS. 11-12, and additional embodiment will now be discussed to deter unauthorized copying of secured papers 40 and documents. Referring first to FIG. 11, a card 20 is illustrated with an invalidity notice 30 printed near its center. The invalidity notice 30 may be a type of indicator 24 printable to the card 20, as discussed throughout this disclosure. It should be understood that the indicator 24 may be printed anywhere on the card 20, which may be consistent with one of the above disclosed examples or another embodiment.

The invalidity notice 30 may be printed to be substantially undetectable to the naked eye. This may be accomplished, for example and without limitation, by printing a thin layer of clear ink to a surface of the card 20. However, if a card 20 with an invalidity notice is copied on a copying device, for example, a scanner or Xerox machine, the invalidity notice 30 may visibly appear on the copy. For example, the invalidity notice 30 may be printed such to reflect light to a scanning device in a manner that would indicate the presence of a darkened area, causing the scanner to reproduce the invisible invalidity notice 30 as a pigmented and visible invalidity notice 32. The appearance of a visible invalidity notice 32 on a copy may be best illustrated in FIG. 12. By including an invalidity notice on a document, a user may advantageously detect and reject invalid cards, papers, or documents quickly and easily. The inclusion of printed graphics 22 and visible characters 28 may be similar the discussion above for FIG. 1.

In operation, the system provides for the creation of a card 20 or paper 40 with a graphic 22 and an indicator 24 that may be compared for validation to assist in the detection of forgeries or invalid copies. In the interest of clarity, the examples below may discuss the system in the context of creating a card 20. Skilled artisans should appreciate that the following examples are additionally applicable to printing papers 40, documents, and other media, and should not view these examples as limiting in any way. Elements discussed in connection with the flowcharts below relate to at least the examples discussed above along with FIGS. 1-12.

Figure 13:
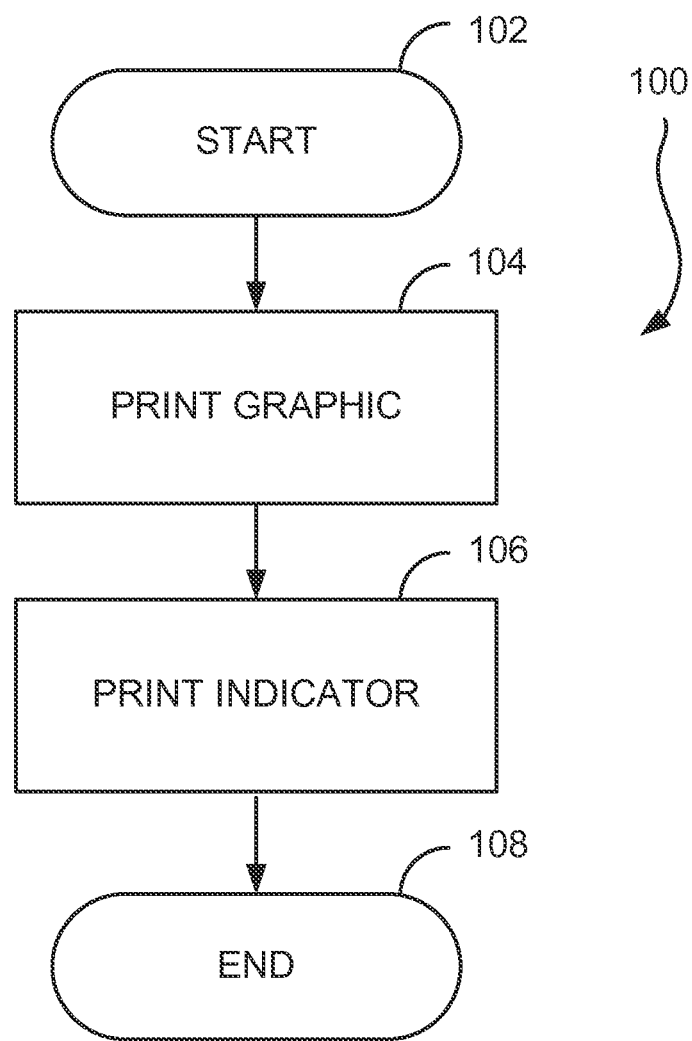
FIG. 13 is a flowchart illustrating an operation of creating a secured paper, according to an embodiment of the present invention.

The general operation of the system is illustrated by flowchart 100 of FIG. 13. Starting at Block 102, the system may print a graphic 22 to a card 20 (Block 104). The graphic 22 to be printed may be determined mechanically, for example using a stamping mechanism or printing plate. The graphic 22 to be printed may also be determined electronically, for example being received from a computerized device. An electronically determined graphic 22 may be printed using, for example, an ink jet printer.

The system may then print an indicator 24 on the paper 40 (Block 106). As discussed above, the indicator 24 may be made using a clear ink, which may include varnish, at a predetermined or variable place. Once the paper 40 has been printed with a graphic 22 and an indicator 24, the operation may terminate (Block 108). Skill artisans will appreciate additional embodiments wherein an indicator 24 may be printed to the card 20 prior to, or simultaneously with, printing the graphic 22.

Figure 14:
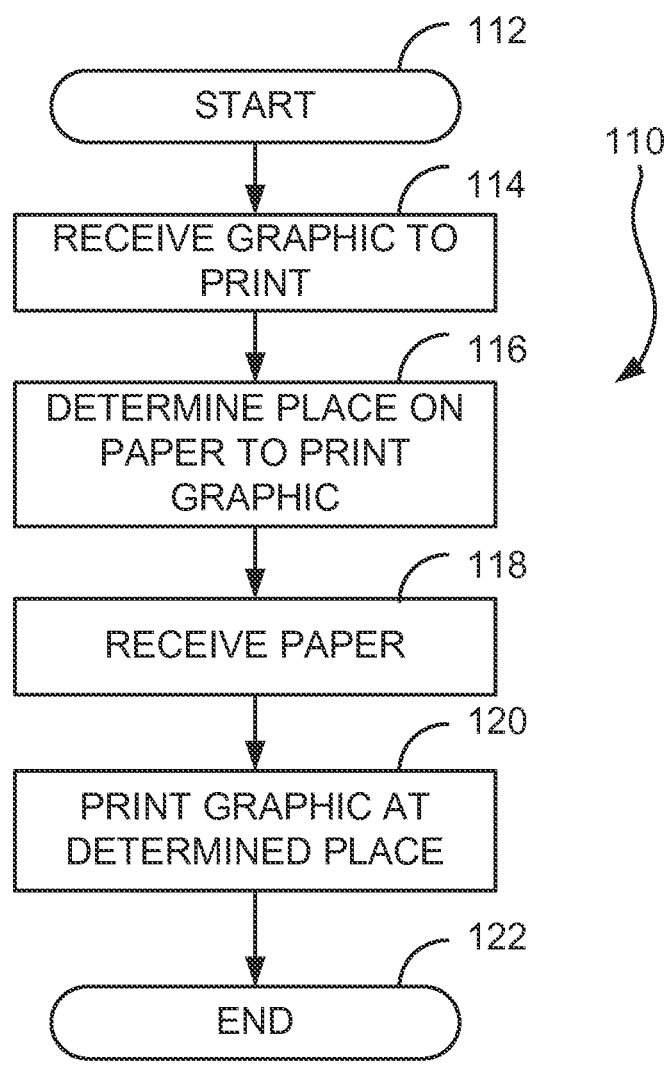
FIG. 14 is a flowchart illustrating an operation of printing a graphic to paper, according to an embodiment of the present invention.

Operation of using the printer 50 to print a graphic 22 with pigmented ink will now be discussed in greater detail along with flowchart 110 of FIG. 14. Starting at Block 112, the printer 50 may receive the graphic 22 to be printed (Block 114). As discussed above, the graphic 22 may be received by the printer 50 to be printed mechanically or electronically. If the graphic 22 is received electronically, data relating to the graphic 22 may be transferred from a computing device to the printer 50. Data received by the printer 50 may be stored in a buffer or memory until it is printed to paper 40.

The after receiving the graphic 22, the printer 50 may determine a place on the paper 40 to print the graphic 22 (Block 116). The place may be manually or electronically controlled. If electronically controlled, the printer 50 may receive data indicating the place the graphic 22 should be printed, for example, from a computing device. The printer 50 may then receive the paper 40 to on which to print the graphic 22 (Block 118). Once the printer 50 has received the graphic 22 to be printed, and determined the place on the paper 40 to print the graphic 22, the printer 50 may print the graphic 22 to the paper 40 using pigmented ink (Block 120). The operation may then terminate at Block 122.

Figure 15:
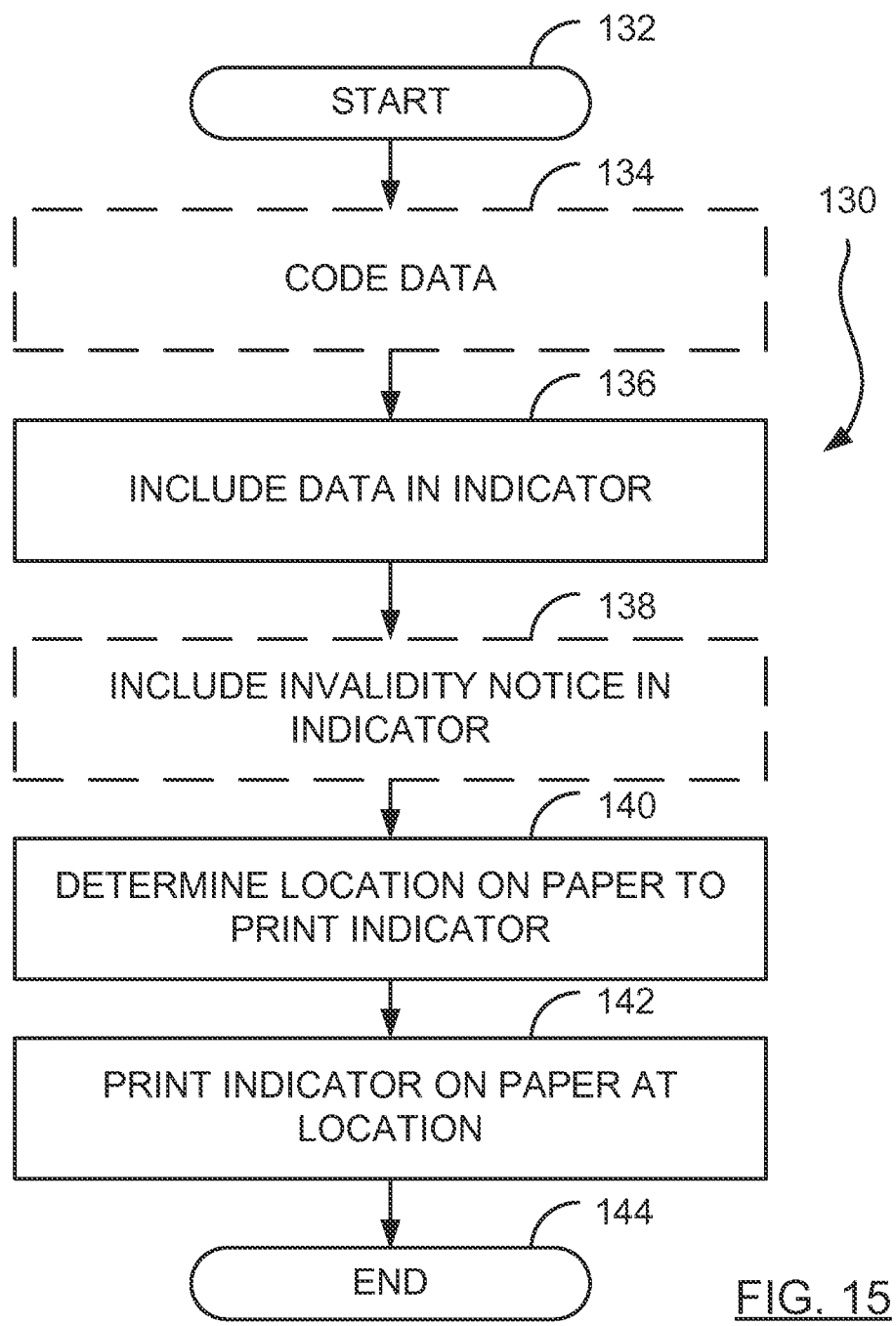
FIG. 15 is a flowchart illustrating an operation of printing an indicator to paper, according to an embodiment of the present invention.

Operation of using the printer 50 to print an indicator 24 with clear ink will now be discussed in greater detail along with flowchart 130 of FIG. 15. Starting at Block 132, data may be optionally coded. (Block 134), the methods of which would be apparent to a skilled artisan. The indicator 24 may include alphanumeric text, symbols, or other objects that may be used to validate the card 20 or paper 40. Coding data may assist in validation by making forgery more difficult.

The data may be included in an indicator 24, which may be printed to the paper 40 (Block 136). Optionally, an invalidity notice 32 may also be included in an indicator, which may be the same indicator 24 as the data or a separate indicator 24 (Block 138).

Next, the printer 50 may determine the location on the paper 40 to print the indicator 24 (Block 140). Once the data has been included in the indicator(s) and the location at which the indicator 24 should be printed is determined, the printer 50 may print the indicator 24 to the paper 40 at the location using clear ink (Block 142). The operation may then terminate (Block 144).

In an embodiment with multiple cards 20 on a paper 40, the data to be included in the indicator 24 may be varied so that each gift card 20 on the paper 40 may include indicators 24 with differing data. Each indicator 24 may optionally be aligned to a place corresponding with a printed graphic 22. The combination of printed graphics 22 and indicators 24 of differing data, each of which may be located at various places on the card 20, advantageously increases the difficulty of forging the secured card 20.

Figure 16:
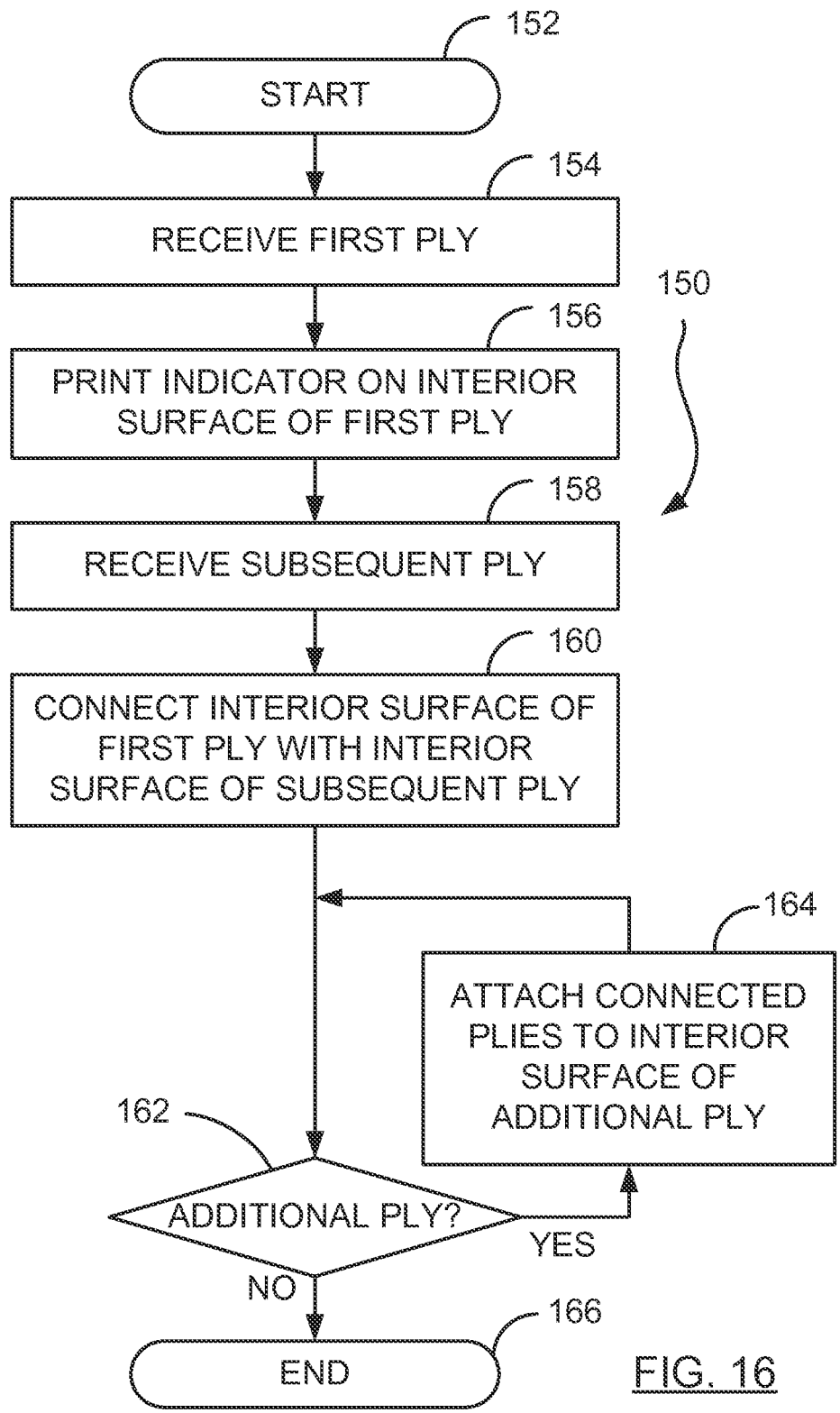
FIG. 16 is a flowchart illustrating an operation of printing an indicator to a paper with a plurality of plies, according to an embodiment of the present invention.

Referring now to the operation shown in flowchart 150 of FIG. 16, an illustrative operation of printing an indicator 24 to paper with a plurality of plies will now be discussed. Starting at Block 152, the printer 50 may receive a first ply (Block 154). The printer may then print an indicator 24 on an interior surface 35 of the first ply, using one or more of the printing operations discussed above (Block 156).

The printer 50 may then receive a subsequent ply at Block 158. Although not pictured, the printer 50 may optionally print an additional impression on the subsequent ply. Once the subsequent ply has been received, and optionally printed, it may be connected to the first ply by the interior surfaces of each ply (Block 160). More specifically, the interior surface of the first ply may be adhered or otherwise connected, or located adjacent to, the interior surface of the subsequent ply, thereby creating a card 20 with a plurality of attached plies.

The operation may next determine whether an additional ply will be included in the plurality of plies (Block 162). If it is determined that no additional ply will be attached to the plurality of plies at Block 162, the operation may terminate at Block 166. Conversely, if it is determined at Block 162 that an additional ply will be included, the additional ply may be connected to the previously connected plies. More specifically, the interior surface of the additional ply may be connected to a surface of the previously connected plies, which would in effect become an interior surface itself. After the additional ply has been connected to the plurality of plies at Block 164, the operation will return to Block 162, wherein it will again determine whether another additional ply may be connected to the plurality of plies. From the return to the determination of Block 162, the operation may continue as discussed above.

Figure 17:
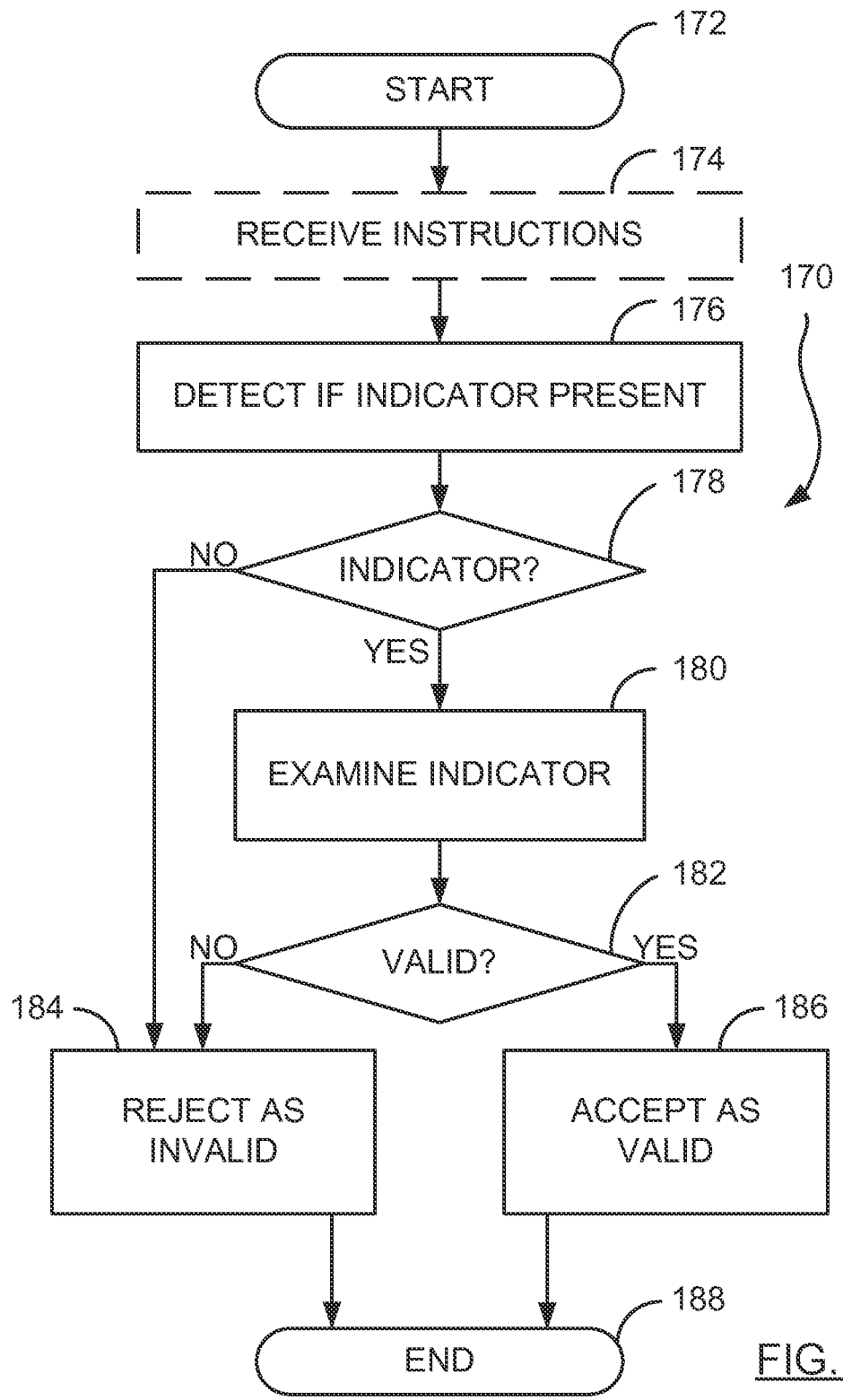
FIGS. 17-18 are flowcharts illustrating authenticating a paper printed with the system, according to various embodiments of the present invention.

Referring now to the operation shown in flowchart 170 of FIG. 17, an illustrative operation of validating a secured card 20 will now be discussed. Skilled artisans will appreciate the following illustrative operation may be used for validating a card 20, paper 40, document, or other media produced by the system of the present invention. Starting at Block 172, a user may optionally receive instructions for examining a card 20 (Block 174). An example of a received instruction may include directions for comparing included graphics 22 with indicators 24 to determine an authenticity of the card 20. The user may be a consumer, a merchant, or any other person that could interact with the card 20. The instructions may be included in the graphic 22 of the card 20, for example, by stating "the first four characters should be raised if authentic." Alternatively, the instructions may be provided by a document accompanying the card 20, a website, a training session, or any other forum to communicate information to a person.

Once the user has optionally received the instruction, he or she may examine the card 20 to detect if an indicator 24 is present (Block 176). For example, the user may analyze whether the graphic 22 and the indicator 24 are present and at a place consistent with the instructions, if provided. The user may then determine whether an indicator 24 was detected on the card 20 (Block 178). If no indicator 24 is detected on the card 20 at Block 178, the user may reject the card 20 as invalid (Block 184). Conversely, if an indicator 24 is detected on the card 20, the user may examine the validity of the indicator 24 (Block 180).

While examining the indicator, the user may compare the detected indicator with an expected indicator. The user may examine the indicator 24 for differences from an expected indicator, since it may not be easily replicated by a person. After the user has analyzed the card 20, he or she may determine whether the indicator is valid (Block 182). If it is determined at Block 182 that the indicator is invalid, the user may reject the card 20 as fraudulent (Block 184). Conversely, if it is determined at Block 182 that the indicator is valid, the card may be accepted as valid (Block 186). After the card 20 has been accepted or rejected, the operation may terminate at Block 188.

Figure 18:
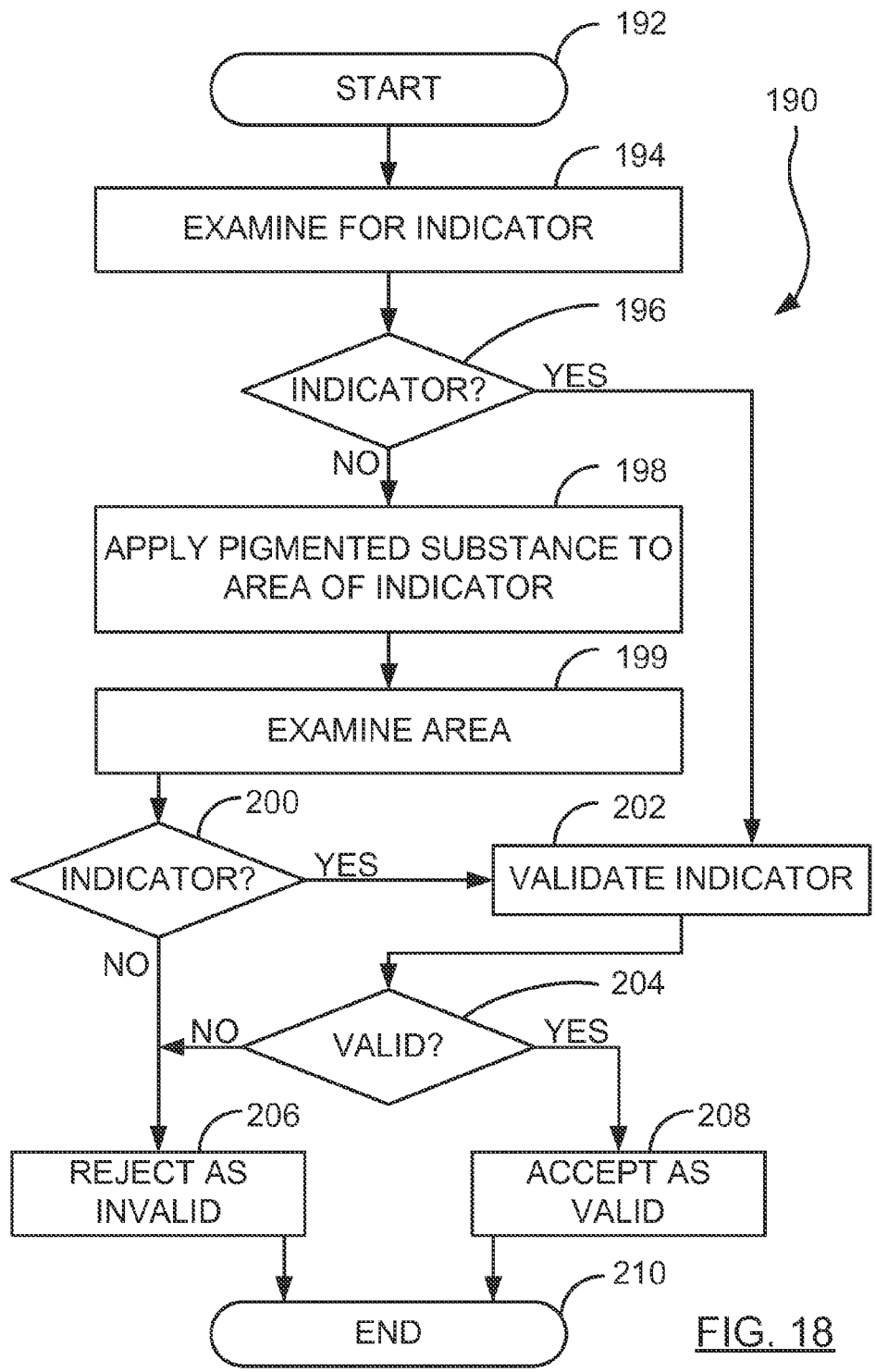

Referring now to the operation shown in flowchart 190 of FIG. 18, and additional operation of validating a secured card will now be discussed. Starting at Block 192, a user may examine the card 20 for an indicator 24 (Block 194). The user may then determine if an indicator 24 has been detected (Block 196). If an indicator 24 is detected at Block 196, the user may proceed to validate the indicator at Block 202. Conversely, if no indicator is detected at Block 196, a pigmented substance may be applied to an area on the card where an indicator may be located (Block 198). The user may then examine the area where the pigmented substance has been applied (Block 199).

Once the area with the pigmented substance has been examined at Block 199, it may be determined whether an indicator 24 is now found (Block 200). If no indicator 24 is found at Block 200, the user may reject the card 20 as invalid (Block 206). Conversely, if an indicator 24 is found at Block 200, the user may then proceed to validate the indicator (Block 202).

Once the area with the indicator 24 has been examined for validity at Block 202, it may be determined whether an indicator 24 is valid (Block 204). If the indicator 24 is found to be invalid at Block 204, the user may reject the card 20 as invalid (Block 206). Conversely, if an indicator 24 is found to be valid at Block 204, the user may then accept the card 20 as valid (Block 208). After the card has been accepted or rejected, the operation may terminate at Block 210.

The above examples have been provided for illustrative purposes only. Discussions of analyzing a card 20 have been provided in the interest of clarity, and are not intended to limit the present invention to applying only to a card 20. Similarly, discussion about an operation being performed by a user is not intended to exclude those operations from being performed by a system, computerized device, machine, or other automated process.

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A system for securing paper comprising:
   an indicator to validate the paper, the indicator being printable on a surface of the paper by a printing device using at an least partially clear ink; and
   data includable in the indicator that is usable to validate the paper, wherein validating the paper comprises the steps of:
   (a) detecting the indicator that is present on the paper,
   (b) examining the indicator to determine whether the paper is likely to be valid or invalid,
   (c) accepting the paper that is likely to be valid, and
   (d) rejecting the paper that is likely to be invalid;
   wherein the indicator adds a texture to the surface of the paper on which it is printed;
   wherein the indicator supplements a graphic printed on the paper by the printing device with pigmented ink;
   wherein the indicator is substantially undetectable without an alteration and detectable with the alteration.

2. The system of claim 1, wherein the at least partially clear ink comprises an approximately clear varnish.

3. The system of claim 1, wherein the printing device comprises an ink jet printer, wherein the at least partially clear ink is includable in a cartridge to be printed by the ink jet printer.

4. The system of claim 1, wherein the alteration is applying a pigmented substance to the indicator.

5. The system of claim 1, wherein the indicator comprises an invalidity notice that is substantially invisible on the paper that is original and becomes substantially visible on an unauthorized reproduction of the paper.

6. The system of claim 1, wherein the paper has a plurality of plies, each ply having an interior surface to be attached to another ply of the plurality of plies, wherein the indicator is printable on the interior surface of a ply, and wherein the ply with the indicator printed on the interior surface is attachable to additional plies by the interior surfaces of each ply to form the plurality of plies.

7. The system of claim 1, wherein the data is coded, and wherein validating the paper additionally comprises between steps (a) and (c):
   (e) decoding the data coded in the indicator.

8. A system for securing paper comprising:
   an indicator to validate the paper, the indicator being printable on a surface of the paper by a printer with an at least partially clear ink of an approximately clear varnish; and
   data includable in the indicator usable to validate paper, the data being coded, wherein validating the paper comprises the steps of:
   (a) detecting the indicator that is present on the paper,
   (b) decoding the data coded in the indicator,
   (c) examining the indicator to determine whether the paper is likely to be valid or invalid,
   (d) accepting the paper that is likely to be valid, and
   (e) rejecting the paper that is likely to be invalid;
   wherein the indicator adds a texture to the surface of the paper on which it is printed;
   wherein the indicator is printable on paper that has a plurality of plies, each ply having an interior surface to be attached to another ply in the plurality of plies, the indicator being printable on the interior surface of a ply, and wherein the ply with the indicator printed on the interior surface is attachable to additional plies by the interior surfaces of each ply to form the plurality of plies;
   wherein the indicator is substantially undetectable without an alteration and detectable with the alteration.

9. The system of claim 8, wherein the indicator supplements a graphic printed on the paper by the printer with pigmented ink.

10. The system of claim 8, wherein the printer is an ink jet printer, wherein the at least partially clear ink is included in a cartridge to be printed by the ink jet printer.

11. The system of claim 8, wherein the alteration is applying a pigmented substance to the indicator.

12. The system of claim 8, wherein the indicator comprises an invalidity notice that is substantially invisible on the paper that is original and becomes substantially visible on an unauthorized reproduction of the paper.

13. A method for securing paper comprising the steps of:
   (a) coding data to indicate a validity of the paper;
   (b) including the data in an indicator; and
   (c) printing an indicator on a surface of the paper with an at least partially clear ink using a printing device, the indicator adding a texture to the surface and being examinable to validate the paper;
   wherein the indicator supplements a graphic printed on the paper by the printer with pigmented ink;
   wherein the indicator is substantially undetectable without an alteration and detectable with the alteration.

14. The method of claim 13, wherein validating the paper further comprises the steps of:
   (i) detecting the indicator that is present on the paper;
   (ii) decoding that data coded in the indicator;
   (iii) examining the indicator to determine whether the paper is likely to be valid or invalid,
   (iv) accepting the paper that is likely to be valid, and
   (v) rejecting the paper that is likely to be invalid.

15. The method of claim 14, wherein validating the paper further comprises before step (i):
   (vi) applying a pigmented substance to the indicator.

16. The method of claim 13, wherein the at least partially clear ink comprises an approximately clear varnish.

17. The method of claim 13, wherein the printer is an ink jet printer, wherein the at least partially clear ink is includable in a cartridge to be printed by the ink jet printer.

18. The method of claim 13, further comprising prior to step (c):
   (d) including an invalidity notice in the indicator that is substantially invisible on the paper that is original and becomes substantially visible on an unauthorized reproduction of the paper.

19. The method of claim 13, wherein the paper has a plurality of plies, each ply having an interior surface to be attached to another ply in the plurality of plies, wherein the indicator is printable on the interior surface of a ply, and wherein the ply with the indicator printed on the interior surface is attachable to additional plies by the interior surfaces of each ply to form the plurality of plies.

* * * * *